US005750911A

United States Patent [19]

Tamura

[11] Patent Number: 5,750,911

[45] Date of Patent: May 12, 1998

[54] SOUND GENERATION METHOD USING HARDWARE AND SOFTWARE SOUND SOURCES

[75] Inventor: Motoichi Tamura, Hamamatsu, Japan

[73] Assignee: Yamaha Corporation, Japan

[21] Appl. No.: 732,929

[22] Filed: Oct. 17, 1996

[30] Foreign Application Priority Data

Oct. 23, 1995 [JP] Japan .................................... 7-297272

[51] Int. Cl.[6] .............................. G09B 15/04; G10H 1/06; G10H 7/00

[52] U.S. Cl. ................................ 84/602; 84/615; 84/622; 84/477 R

[58] Field of Search ........................ 84/600–625, 470 R, 84/477 R, 478

[56] References Cited

U.S. PATENT DOCUMENTS

| | | | |
|---|---|---|---|
| 4,441,399 | 4/1984 | Wiggins et al. | 84/470 R |
| 4,731,847 | 3/1988 | Lybrook et al. | 84/622 X |
| 5,020,410 | 6/1991 | Sasaki . | |
| 5,121,667 | 6/1992 | Emery et al. . | |
| 5,235,124 | 8/1993 | Okamura et al. | 84/601 |
| 5,319,151 | 6/1994 | Shiba et al. . | |
| 5,376,752 | 12/1994 | Limberis et al. . | |
| 5,448,009 | 9/1995 | Kudo . | |
| 5,471,009 | 11/1995 | Oba et al. | 84/600 X |

FOREIGN PATENT DOCUMENTS

| | | | |
|---|---|---|---|
| 0 597 381 | 5/1994 | European Pat. Off. . | |
| WO 94/11858 | 5/1994 | WIPO . | |

*Primary Examiner*—Stanley J. Witkowski
*Attorney, Agent, or Firm*—Graham & James LLP

[57] ABSTRACT

In a music apparatus virtually built in a computer machine, an application module is composed of an application program which is executed by the computer machine to produce an audio message. A software sound source is composed of a tone generation program which is executed by the computer machine so as to generate a musical tone according to the audio message. A hardware sound source having a tone generation circuit is physically coupled to the computer machine for generating a musical tone according to the audio message. An application program interface is interposed to connect the application module to either of the software sound source and the hardware sound source. A controller is provided for controlling the application program interface to selectively distribute the audio message from the application module to at least one of the software sound source and the hardware sound source through the application program interface.

21 Claims, 10 Drawing Sheets

SOUND GENERATION METHOD USING HARDWARE AND SOFTWARE SOUND SOURCES

BACKGROUND OF THE INVENTION

The present invention relates to a musical sound generating method using a general-purpose processing machine having a CPU (central processing unit) for generating a musical sound.

Conventionally, a musical sound generating apparatus is provided with a dedicated sound source circuit (hardware sound source) which operates according to frequency modulating method or waveform memory method under control of a microprocessor such as CPU. The hardware sound source is controlled by the CPU according to performance information (audio message) received from an MIDI (Musical Instrument Digital Interface), a keyboard or a sequencer so as to generate a musical sound or tone. Thus, the conventional musical sound generating apparatus is a dedicated one that is specifically designed to generate the musical sound. In other words, the dedicated musical sound generating apparatus should be used exclusively to generate the musical sound.

To solve such a problem, recently, a musical sound generating method has been proposed for substituting function of the hardware sound source with a sound source process by a computer program (this process is referred to as "software sound source") and for causing the CPU to execute a primary performance process and a secondary tone generation process. Such a software sound source has been proposed in Japanese Patent Application No. HEI 7-144159 filed May. 19, 1995 and U.S. patent application Ser. No. 08/649,168 filed May. 17, 1996. It should be noted that these applications are not yet made public. In this method, the primary performance process is executed to generate control information for controlling generation of a musical tone corresponding to audio message such as MIDI message. The secondary tone generation process is executed for generating waveform data of the musical tone according to the control information generated in the primary performance process.

In a practical form, a computer operating system having a CPU executes the performance process by detecting key operations while executing an interrupting operation of the tone generation process at every sampling period that is a converting operation timing of a digital/analog converter. The CPU calculates and generates waveform data for one sample of each tone generation channel, and then the CPU returns to the performance process. In such a musical sound generating method, a DA converter chip is used as well as the CPU and the software sound source without need to use the dedicated hardware sound source in order to generate a musical sound.

In the above-described conventional musical sound generating method using the software sound source, the software sound source is exclusively used to generate a musical tone. The performance information or audio message is exclusively distributed to the software sound source. The software sound source can be installed in a general-purpose computer such as a personal computer. Normally, the personal computer or the like has the hardware sound source provided in the form of a sound card. However, when the musical sound generating method using the software sound source is used by the general-purpose computer having the hardware sound source provided in the form of the extension sound card, the hardware sound source cannot be efficiently used since the audio message is exclusively distributed to the software sound source.

SUMMARY OF THE INVENTION

Therefore, an object of the present invention is to provide a musical sound generating method that can efficiently use a hardware sound source along with a software sound source.

To accomplish the above-described object, the inventive music apparatus virtually built in a computer machine comprises an application module composed of an application program executed by the computer machine to produce an audio message, a software sound source composed of a tone generation program executed by the computer machine so as to generate a musical tone according to the audio message, a hardware sound source having a tone generation circuit physically coupled to the computer machine for generating a musical tone according to the audio message, an application program interface interposed to connect the application module to either of the software sound source and the hardware sound source, and control means for controlling the application program interface to selectively distribute the audio message from the application module to at least one of the software sound source and the hardware sound source through the application program interface.

In a specific form, the control means controls the application program interface to concurrently distribute the audio message to both of the software sound source and the hardware sound source. The application module may produce the audio message which commands concurrent generation of a required number of musical tones while the hardware sound source has a limited number of tone generation channels capable of concurrently generating the limited number of musical tones. In such a case, the control means normally operates when the required number does not exceed the limited number for distributing the audio message only to the hardware sound source and supplementarily operates when the required number exceeds the limited number for distributing the audio message also to the software sound source to thereby ensure the concurrent generation of the required number of musical tones by both of the hardware sound source and the software sound source. The application module may produce audio messages which command generation of musical tones a part by part of a music piece created by the application program. In such a case, the control means selectively distributes the audio messages a part by part basis to either of the software sound source and the hardware sound source. The application module may produce the audio message which commands generation of a musical tone having a specific timbre. In such a case, the control means operates when the specific timbre is not available in the hardware sound source for distributing the audio message to the software sound source which supports the specific timbre. The application module may produce the audio message which specifies an algorithm used for generation of a musical tone. In such a case, the control means operates when the specified algorithm is not available in the hardware sound source for distributing the audio message to the software sound source which supports the specified algorithm. The application module may produce a multimedia message containing the audio message and a video message which commands reproduction of a picture. In such a case, the control means controls a selected one of the software sound source and the hardware sound source to generate the musical tone in synchronization with the reproduction of the picture.

According to the invention, either of the software sound source or the hardware sound source is selected, and the performance information or audio message is output to the selected sound source. Thus, to reduce a work load of the CPU, a user can select the hardware sound source if desired. When the performance information is output to both of the hardware sound source and the software sound source, an ensemble instrumental accompaniment can be performed. In this case, a waveform sample of a musical tone calculated and generated by the software sound source is once stored in an output buffer, and is then read out from the output buffer. Thus, the instrumental accompaniment is delayed for a predetermined time period. Another waveform sample of another musical tone that is output from the hardware sound source is intentionally delayed in matching with the delay of the instrumental accompaniment that is output from the software sound source. By such a manner, the delay of the musical tone that is output from the software sound source can be compensated or cancelled out by the intentional delay operation of the hardware sound source.

In addition, the performance information may be normally output to the hardware sound source rather than the software sound source with the first priority. If the required number of the channels exceeds the available tone generation channels of the hardware sound source, the performance information is also output to the software sound source. More number of musical tones can be generated than the case where only the hardware sound source or the software sound source is used. The type of the sound source (namely, software or hardware) receiving the performance information can be designated for each instrumental accompaniment part. A suitable one of the hardware and software sound sources is selectively designated for individual instrumental accompaniment parts. When a special timbre corresponding to waveform data or a specific tone generation algorithm that the hardware sound source does not have is specified by the audio message, the software sound source can be selected in place of the hardware sound source in order to obviate the functional limitation of the hardware sound source. The musical tone may be generated from the sound source while other information such as picture information may be simultaneously reproduced. Even if either of the software sound source or the hardware sound source is selected as an output destination of the performance information, the musical tone is generated from the selected sound source in synchronization with the other information such as the picture information.

DETAILED DESCRIPTION OF THE INVENTION

Figure 1:
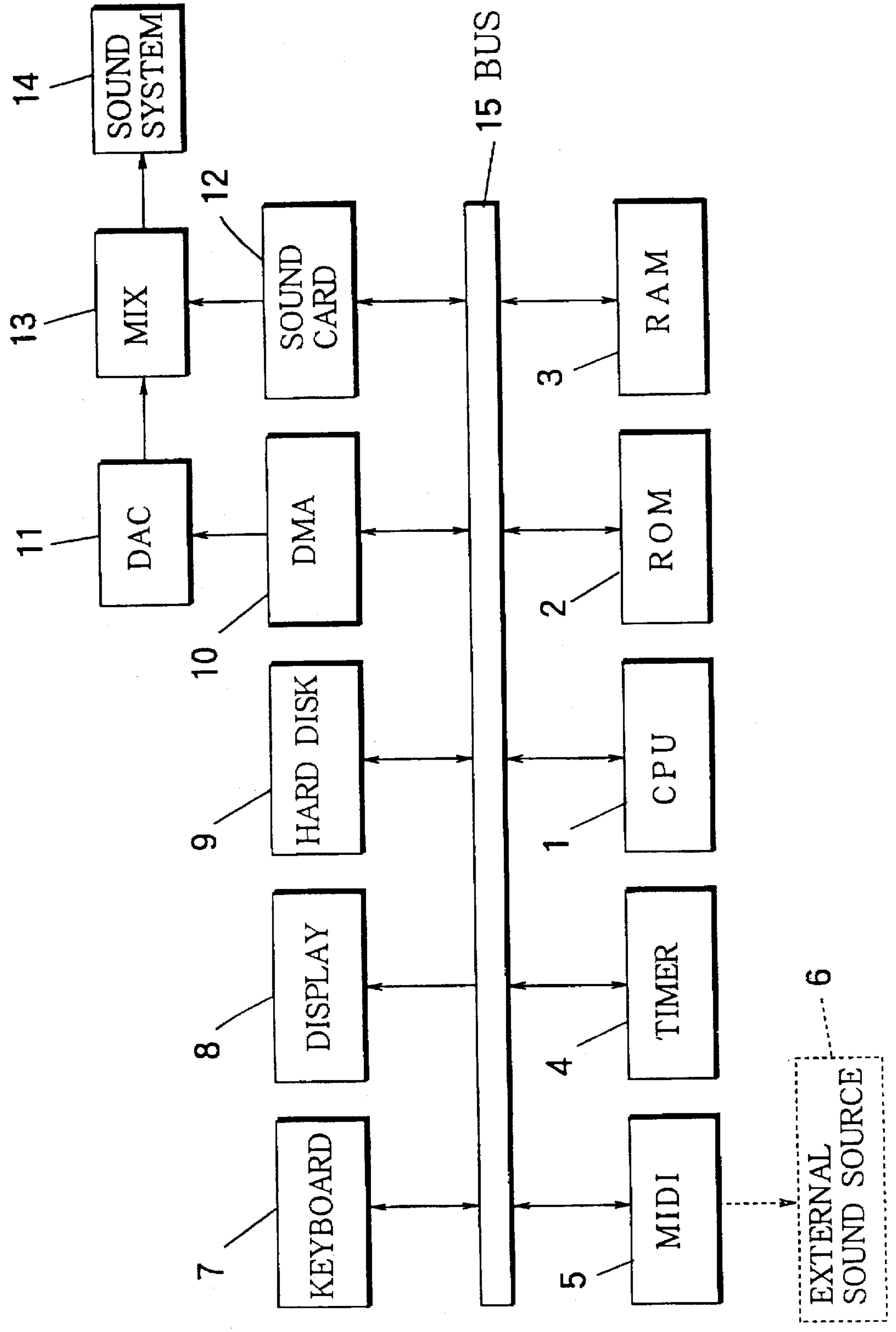
FIG. 1 is a schematic diagram showing an embodiment of a musical sound generating apparatus that can execute a musical sound generating method according to the present invention.

FIG. 1 shows a structure of a musical sound generating apparatus that can execute a musical sound generating method according to the present invention. In FIG. 1, reference numeral 1 denotes a microprocessor (CPU) that executes an application program and performs various controls such as generation of a musical tone waveform sample. Reference numeral 2 denotes a read-only memory (ROM) that stores preset timbre data and so forth. Reference number 3 denotes a random access memory (RAM) that has storage areas such as a work memory area for the CPU 1, a timbre data area, an input buffer area, a channel register area, and an output buffer area. Reference numeral 4 denotes a timer that counts time and sends timing of a timer interrupting process to the CPU 1. Reference numeral 5 denotes an MIDI interface that receives an input MIDI event and outputs a generated MIDI event. As denoted by a dotted line, the MIDI interface 5 can be connected to an external sound source 6.

Reference numeral 7 denotes a so-called personal computer keyboard having alphanumeric keys, Kana keys, symbol keys, and so forth. Reference numeral 8 denotes a display monitor with which a user interactively communicates with the musical sound generating apparatus. Reference numeral 9 denotes a hard disk drive (HDD) that stores various installed application programs and that stores musical sound waveform data and so forth used to generate musical tone waveform samples. Reference numeral 10 denotes a DMA (Direct Memory Access) circuit that directly transfers the musical tone waveform sample data stored in a predetermined area (assigned by the CPU 1) of the RAM 3 without control of the CPU 1, and supplies the data to a digital analog converter (DAC) 11 at a predetermined sampling interval (for example, 48 kHz). Reference numeral 11 denotes the digital analog converter (DAC) that receives the musical tone waveform sample data and converts the same into a corresponding analog signal. Reference numeral 12 denotes a kind of expansion circuit board such as a sound card constituting the hardware sound source physically coupled to a computer machine. Reference numeral 13 denotes a mixer circuit (MIX) that mixes a musical tone signal output from the DAC 11 with another musical tone signal output from the sound card 12. Reference numeral 14 denotes a sound system that generates a sound corresponding to the musical tone signals converted into the analog signal output from the mixer circuit 13.

Figure 2:
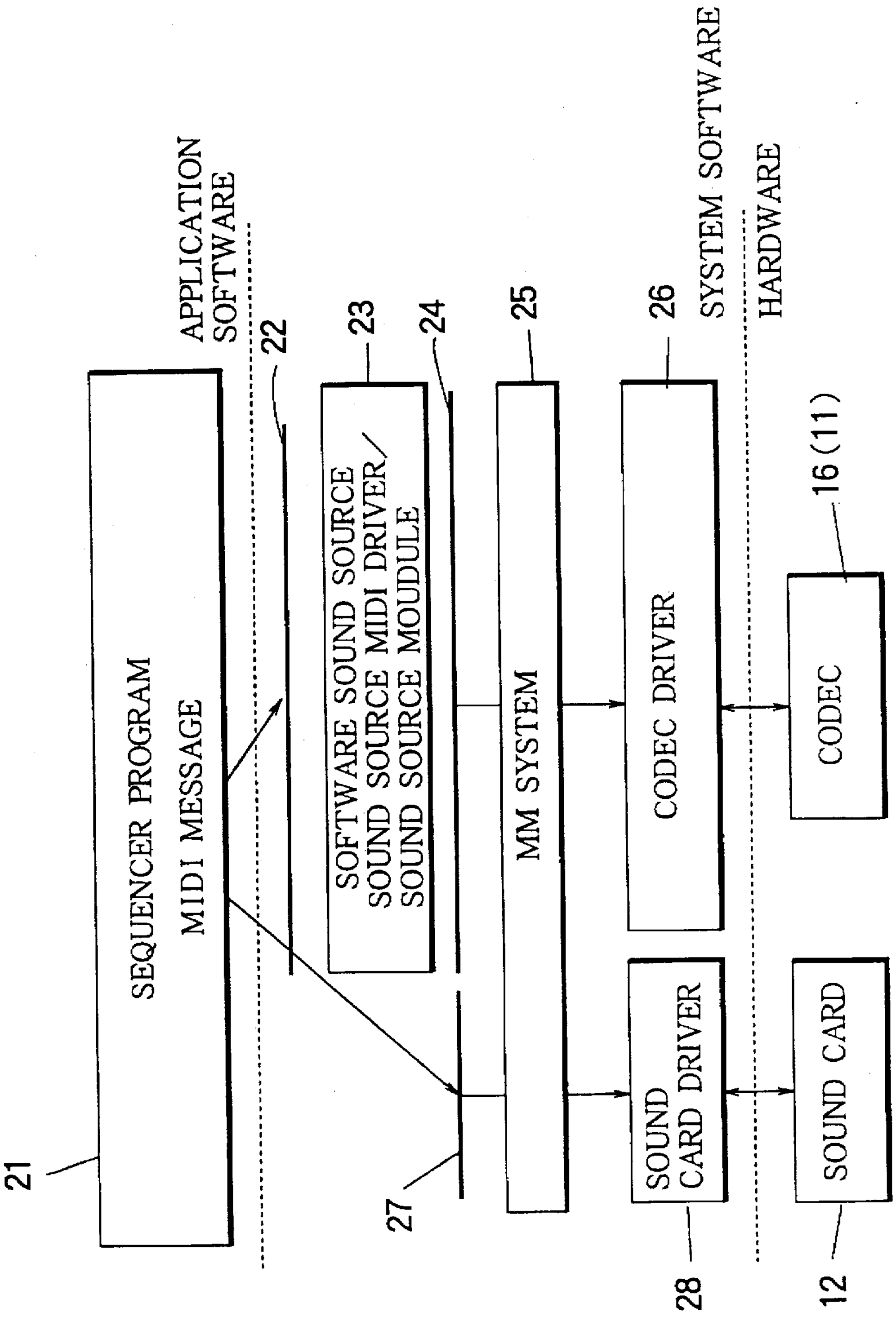
FIG. 2 is a schematic diagram showing a structure of a software module installed in the musical sound generating apparatus shown in FIG. 1.

The above-described structure is the same as the structure of a general-purpose computer machine such as a personal computer or a work station. The musical sound generating method can be embodied in such a general-purpose computer machine. FIG. 2 shows an example of layer structure of software modules of the musical sound generating apparatus. In FIG. 2, for simplicity, only portions relating to the musical sound generating method according to the present invention are illustrated. As shown in FIG. 2, an application software is positioned at a highest layer. Reference numeral 21 denotes an application program executed to issue or produce an audio message for requesting or commanding reproduction of MIDI data. The application software may include MIDI sequence software, game software, and karaoke software. Hereinafter, such an application software is referred to as "sequencer program".

The application software is followed by a system software block. The system software block contains a software sound source 23. The software sound source 23 includes a sound source MIDI driver and a sound source module. Reference numeral 25 denotes a program block that performs a so-called multi-media (MM) function. This program block includes waveform input/output drivers. Reference numeral 26 denotes a CODEC driver for driving a CODEC circuit 16 that will be described later. Reference numeral 28 denotes a sound card driver for driving the sound card 12. The CODEC circuit 16 includes an A/D converter and a D/A converter. The D/A converter accords with the DAC 11 shown in FIG. 1.

Reference numeral 22 denotes a software sound source MIDI output API (application programming interface) that interfaces between the application program 21 and the software sound source 23. Reference numeral 24 denotes a waveform output API that interfaces between the application program and the waveform input/output drivers disposed in the program block 25. Reference numeral 27 denotes an MIDI output API that interfaces between an application program such as the sequencer program 21, and the sound card driver 28 and the external sound source 6. Each application program can use various services that the system program provides through the APIs. Although not shown in FIG. 2, the system software includes a device driver block and a program block for memory management, file system, and user interface likewise a general-purpose operating system (OS).

In such a structure, an MIDI event is produced as performance information or audio message from the sequencer program 21. In the present invention, as shown in FIG. 2, the performance information can be distributed to one of the software sound source MIDI output API 22 and the MIDI output API 27 or to both thereof. In this case, one of the APIs that receives an MIDI event is designated, and the MIDI event is sent from the sequencer program 21 to the designated API. However, when the hardware sound source is not mounted, the hardware sound source cannot be designated or selected.

When the software sound source 23 is selected as an output destination of the performance information sent from the sequencer program 21 and an MIDI event is output to the software sound source MIDI output API 22, the software sound source 23 converts the received audio message into waveform output data and the waveform output API 24 is accessed. Thus, the waveform data corresponding to a musical sound to be generated is output to the CODEC circuit 16 through the CODEC driver 26. The output signal of the CODEC circuit 16 is converted into an analog signal by the DAC 11. A musical sound corresponding to the analog signal is generated by the sound system 14.

On the other hand, when the hardware sound source composed of the sound card 12 is selected as an output destination of the performance information sent from the sequencer program 21 and an MIDI event is output to the MIDI output API 27, the MIDI event is distributed to the hardware sound source composed of the sound card 12 through the sound card driver 28. A musical sound is generated according to a musical sound generating algorithm adopted by the hardware sound source.

When the external sound source 6 disposed outside the apparatus is selected as an output destination of the performance information, an MIDI event is output to the MIDI output API 27. The MIDI event is distributed to the external sound source 6 through the external MIDI driver contained in the program block 25 and the MIDI interface 5. Thus, a musical sound corresponding to the distributed MIDI event is generated from the external sound source 6.

Figure 3:
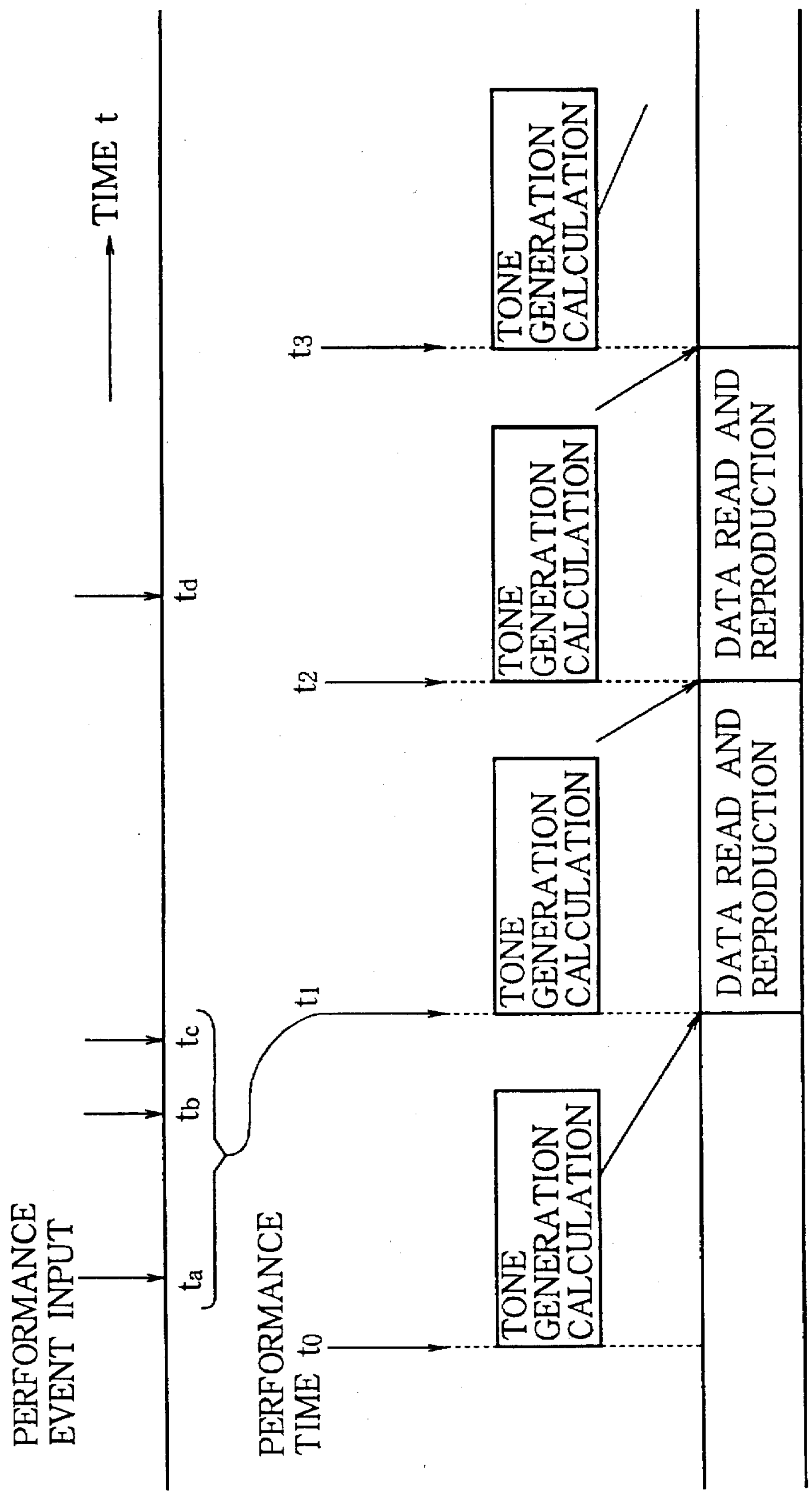
FIG. 3 is a schematic diagram showing the musical sound generating process using the software sound source.

FIG. 3 is a schematic diagram for explaining the musical sound generating process performed by the software sound source 23. In FIG. 3, "performance input" denotes an MIDI event that is produced from the sequencer program 21. For example, MIDI events are sequentially produced at timings ta, tb, tc, td, and so forth according to a musical score treated by the sequencer program. When an MIDI event is received, an interruption with the highest priority is generated. In the MIDI receive interrupting process, the MIDI event is stored in an input buffer along with receipt time data. The software sound source 23 performs the MIDI process for writing sound control signals corresponding to individual MIDI events to sound source registers of tone generation channels.

The middle portion of FIG. 3 shows timings at which waveform generating calculations are executed by the software sound source 23. The waveform generating calculations are performed at predetermined intervals as indicated by calculation timings t0, t1, t2, t3, and so forth. Each interval is referred to as a frame interval. The interval length is determined to sufficiently produce a number of waveform samples that can be stored in one output buffer. In each frame interval, the waveform generating calculation of each tone generation channel is executed based on the sound control signal stored in the sound source register of each tone generation channel by the MIDI process according to the MIDI event received in a preceding frame interval. The generated waveform data is accumulated in the output buffer. As shown in the lower portion of FIG. 3, the waveform data is successively read by the DMA circuit 10 in a succeeding frame interval. An analog signal is generated by the DAC 11. Thus, the musical sound is continuously generated.

Figure 4:
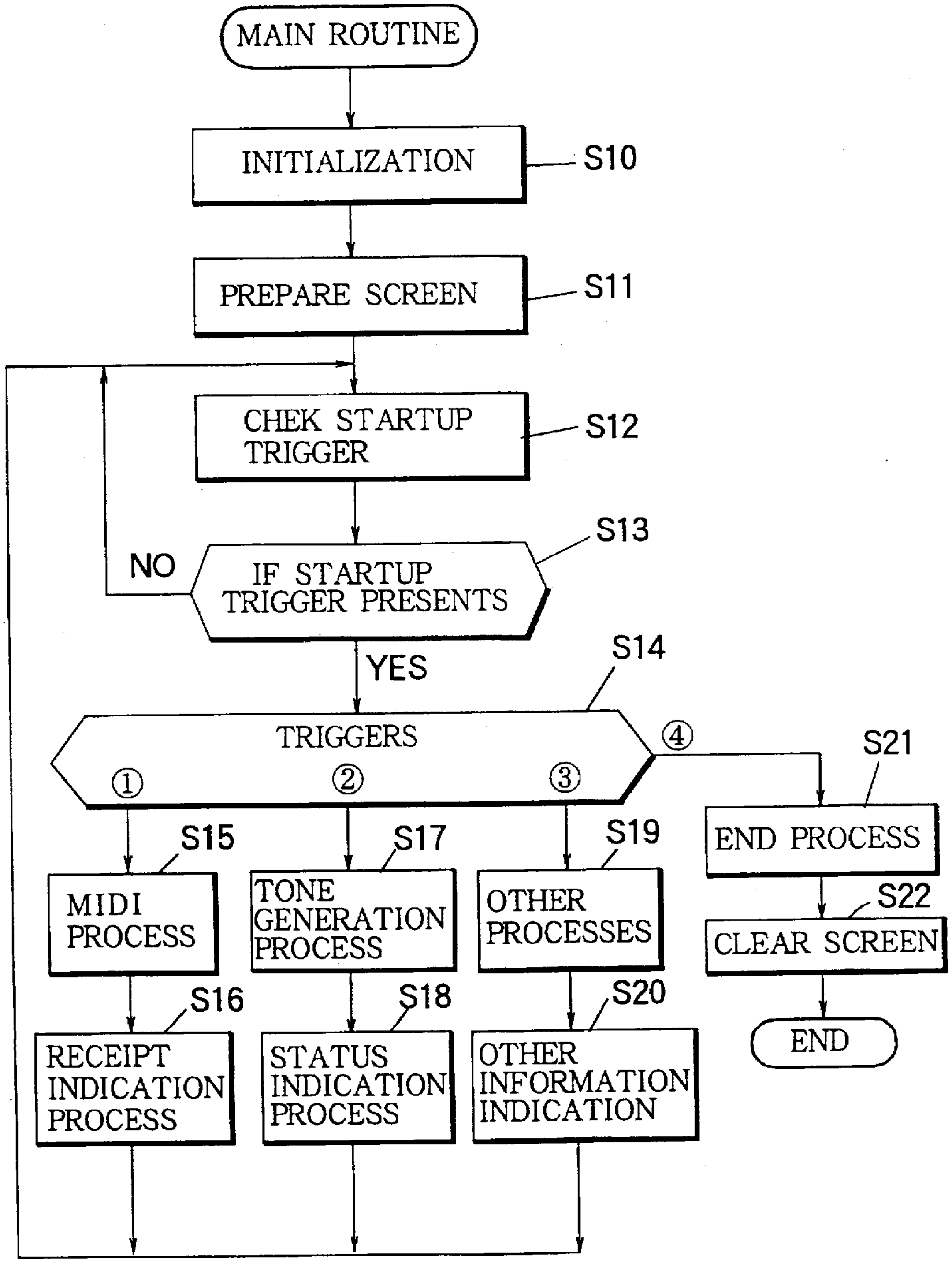
FIG. 4 is a flow chart showing a software sound source process.

FIG. 4 is a flow chart showing a process executed by the software sound source 23. When the software sound source 23 is started up, at step S10, an initializing process is performed for clearing contents of various registers. Thereafter, the routine advances to step S11. At step S11, a screen preparing process is performed for displaying an icon representing that the software sound source has been started up. Next, the routine advances to step S12. At step S12, it is determined whether there is a startup cause or initiative trigger. There are four kinds of startup triggers: (1) the input buffer has an event that has not been processed (this trigger takes place when an MIDI event is received); (2) a waveform calculating request takes place at a calculation time; (3) a process request other than the MIDI process takes place such that a control command for operating the sound source is input from the keyboard or the panel; and (4) an end request takes place.

At step S13, it is determined whether there is a startup cause or initiative trigger. When the check result at step S13 is NO, the routine returns to step S12. At step S12, the system waits until a startup cause takes place. When the check result at step S13 is YES (namely, a startup cause is detected), the routine advances to step S14. At step S14, it is determined whether the startup cause is one of the items (1) to (4).

When the startup cause is (1) (namely, the input buffer has an event that has not been processed), the routine advances to step S15. At step S15, the MIDI process is performed. In the MIDI process, the MIDI event stored in the input buffer is converted into control parameters to be sent to a relevant sound source at a relevant channel. After the MIDI process at step S15 is completed, the routine advances to step S16. At step S16, a receipt indication process is performed. The screen of the monitor indicates that the MIDI event has been received. Thereafter, the routine returns to step S12. At step S12, the system waits until another startup or initiative cause takes place.

Figure 5A:
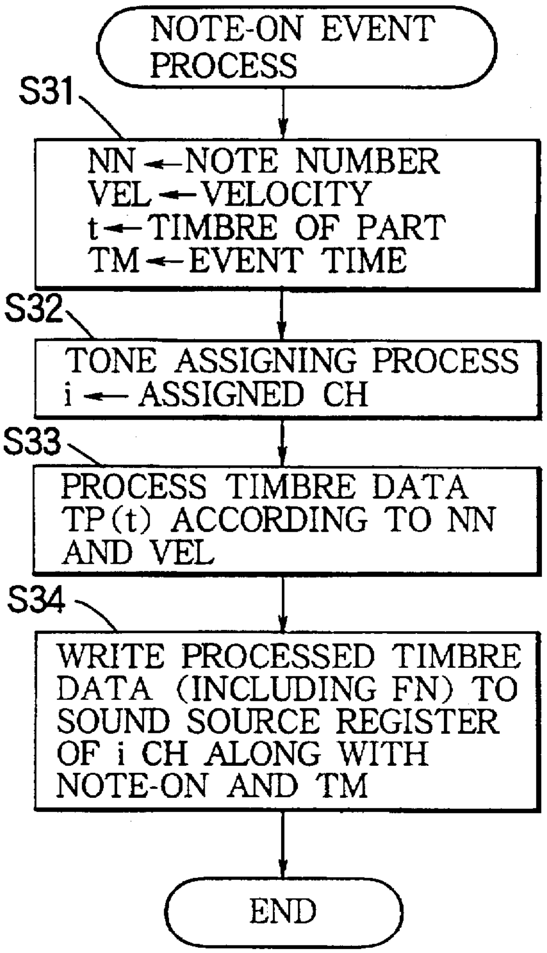
FIGS. 5(*a*) and 5(*b*) are flow charts showing an MIDI process.
Figure 5B:
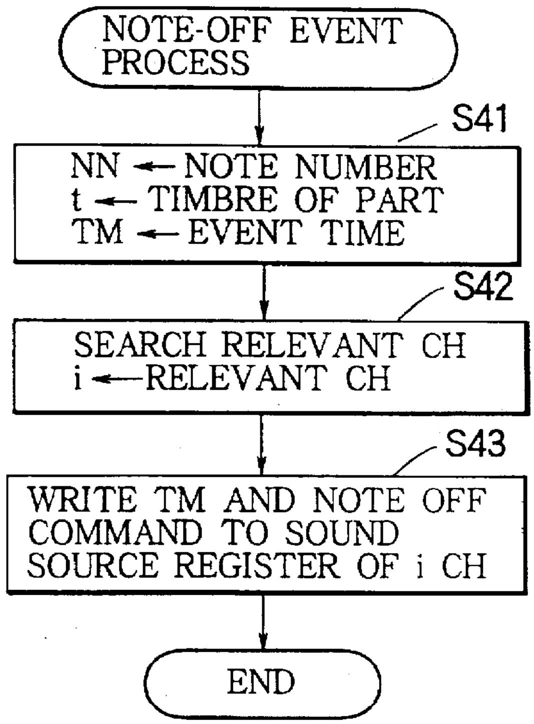

FIGS. 5(*a*) and 5(*b*) show an example of the MIDI process performed at step S15. FIG. 5(*a*) is a flow chart showing the MIDI process that is executed when an MIDI event stored in the input buffer is a note-on event. When the event that has not yet been processed is a note-on event, the routine advances to step S31. At step S31, a note number NN, a velocity VEL, and a timbre number t of each part of a music score are stored in respective registers. In addition, the time at which the note-on event takes place is stored in a TM register. Next, the routine advances to step S32. At step S32, a channel assigning process is performed for the note number NN stored in the register. A channel number i is assigned and stored in a register. Thereafter, the routine advances to step S33. At step S33, timbre data TP(t) corresponding to the registered timbre number t is processed according to the note number NN and the velocity VEL. At step S34, the processed timbre data, the note-on command and the time data TM are written into a sound source register of the i channel. Thereafter, the note-on event process is completed.

FIG. 5(*b*) is a flow chart showing a process in case that the event that has not yet been processed is a note-off event. When the note-off process is started, at step S41, a note number NN of the note-off event in the input buffer and the timbre number t of a corresponding part are stored in respective registers. In addition, the time at which the note-off event takes place is stored as TM in a register. Thereafter, the routine advances to step S42. At step S42, a tone generation channel (ch) at which the sound is being generated for the note number NN is searched. The found channel number i is stored in a register. Next, the routine advances to step S43. At step S43, the note-off command and the event time TM are written to a sound source register of the i channel. Thereafter, the note-off event process is completed.

Referring back to FIG. 4, at step S14, when the startup cause is (2) (namely, the waveform calculating request takes place), a tone generation process at step S17 is executed. This process performs waveform generating calculation. The waveform generating calculation is performed according to the musical sound control information which is obtained by the MIDI process at step S15 and which is stored in the sound source register for each channel (ch). After the tone generation process at step S17 is completed, the routine advances to step S18. At step S18, an amount of work load of the CPU necessary for the tone generation process is indicated on the display. Thereafter, the routine returns to step S12. At step S12, the system waits until another startup cause takes place.

In the tone generation process at step S17, waveform calculations of LFO, filter G, and volume EG for the first channel are performed. An LFO waveform sample, an FEG waveform sample and an AEG waveform sample are calculated. These samples are necessary for generation of a tone element within a predetermined time period. The LFO waveform is added to those of the F number, the FEG waveform and the AEG waveform so as to modulate individual data. For a tone generation channel to be muffled, a dumping AEG waveform is calculated such that the volume EG thereof sharply attenuates in a predetermined time period. Thereafter, the F number is repeatedly added to an initial value which is the last read address of the preceding period so as to generate a read address of each sample in the current time period. Corresponding to an integer part of the read address, a waveform sample is read from a waveform storage region of the timbre data. In addition, the read waveform samples are interpolated according to a decimal part of the read address. Thus, all interpolated samples in the current time period are calculated. In addition, a timbre filter process is performed for the interpolated samples in the time period. The timbre control is performed according to the FEG waveform. The amplitude control process is performed for the samples that have been filter-processed in the time period. The amplitude of the musical sound is controlled according to the AEG and volume data. In addition, an accumulative write process is executed for adding the musical sound waveform samples that have been amplitude-controlled in the time period to samples of the output buffer. Until calculations of all the channels are completed, the waveform sample generating process is performed. The generated samples in the predetermined time period are successively added to the samples stored in the output buffer. The MIDI process at step S15 and the tone generation process at step S17 are described in the aforementioned Japanese Patent Application No. HEI 7-144159.

At step S14, when the startup cause is (3) (namely, other process request takes place), the routine or flow advances to step S19. At step S19, when the process request is, for example, a timbre setting/changing process, a new timbre number is set. Thereafter, the flow advances to step S20. At step S20, the set timbre number is displayed. Next, the flow returns to step S12. At step S12, the system waits until another startup cause takes place.

At step S14, when the startup cause is (4) (namely, the end request takes place), the flow advances to step S21. At step S21, the end process is performed. At step S22, the screen is cleared and the software sound source process is completed.

Figure 6:
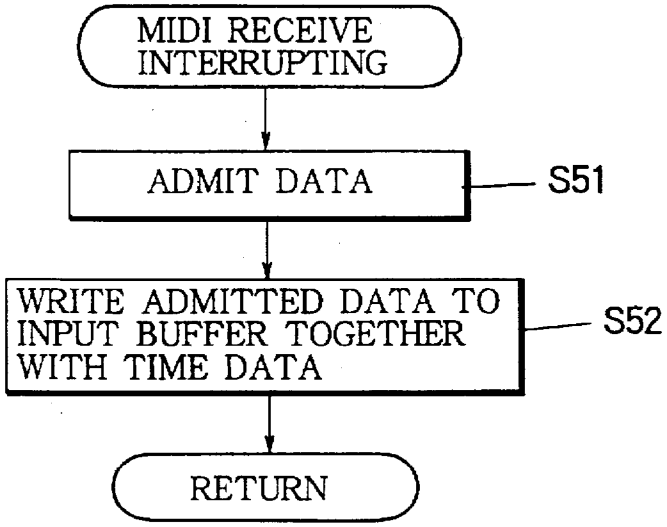
FIG. 6 is a flow chart showing an MIDI receipt interrupting process.

FIG. 6 is a flow chart showing an MIDI receive interrupting process executed by the CPU 1. This process is called upon an interrupt that takes place when the software sound source MIDI output API 22 is selected and the performance information (MIDI event) is received from the sequencer program 21 or the like. This interrupt has the highest priority. Thus, the MIDI receive interrupting process precedes to other processes such as the process of the sequencer program 21 and the process of the software sound source 23. When the MIDI receive interrupting process is called, the MIDI event data received at step S51 is admitted. Next, the flow advances to step S52. At step S52, a pair of the received MIDI data and the receipt time data are written into the input buffer. Thereafter, the flow returns to the main process at which the interrupt took place. Thus, the received MIDI data is successively written into the input buffer along with the time data which indicates the receipt time of the MIDI event data.

Figure 7:
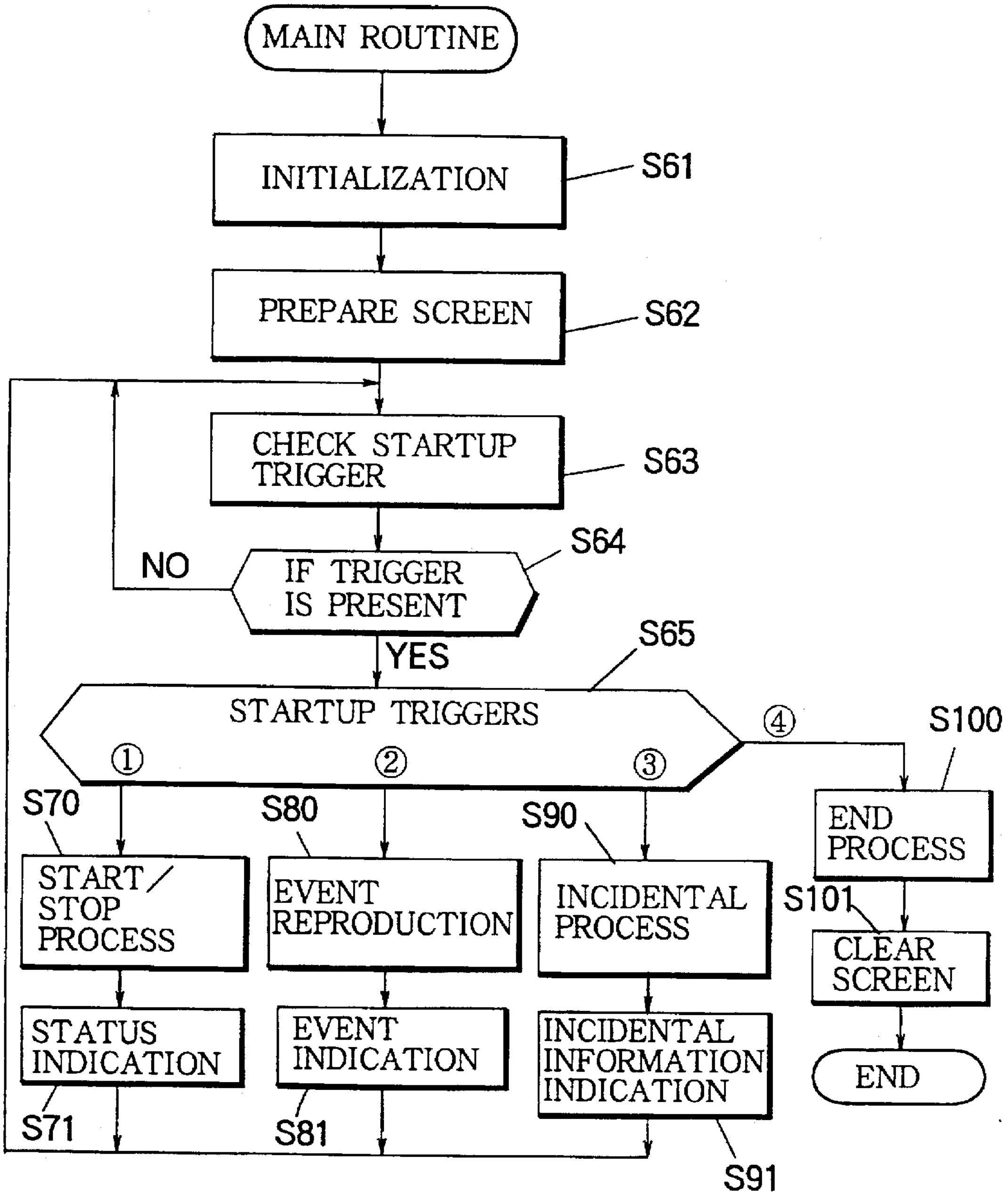
FIG. 7 is a flow chart showing a process of a sequencer.
Figure 8A:
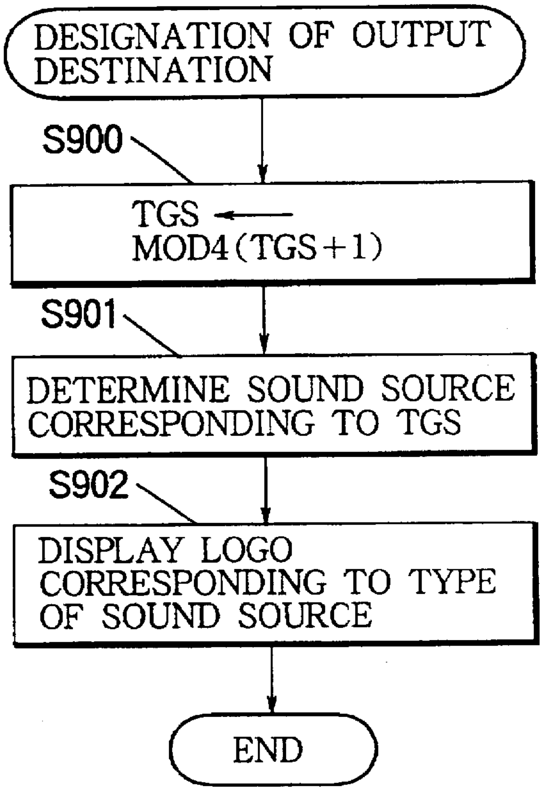
FIGS. 8(*a*)–8(*d*) are schematic diagrams for explaining an output destination assigning process.
Figure 8B:
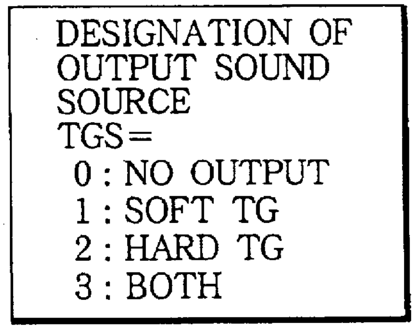
Figure 8C:
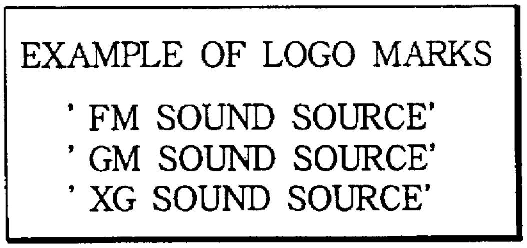
Figure 8D:
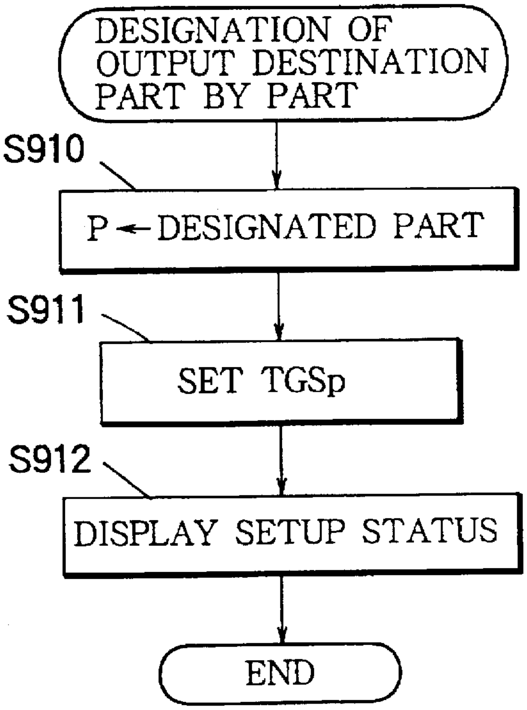

FIG. 7 is a flow chart showing the process of the sequencer program 21. When the sequencer program 21 is started at step S61, an initializing process is performed for clearing various registers. Thereafter, the flow advances to step S62. At step S62, a screen preparation process is performed for displaying an icon representing that the program is being executed. Next, the flow advances to step S63. At step S63, it is determined whether or not a startup trigger takes place. At step S64, when it is determined that a startup trigger takes place, the flow advances to step S65. At step S65, it is determined which kind of the startup triggers has occurred. When a startup trigger does not take place, the flow returns to step S63. At step S63, the system waits until a startup trigger or cause takes place. There are following startup causes of the sequencer program: (1) a start/stop request takes place; (2) an interrupt takes place from a tempo timer; (3) an incidental request takes place (for example, an output destination sound source is assigned, a tempo is changed, a part balance is changed, a music piece treated by the program is edited, or a recording process of automatic instrumental accompaniment is performed) and (4) a program end request takes place.

When the check result of step S65 indicates the cause (3) (namely, an incidental request takes place), the flow advances to step S90. At step S90, a process corresponding to the incidental request is performed. Thereafter, the flow advances to step S91. At step S91, information corresponding to the performed process is displayed. Next, the flow returns to step S63. At step S63, the system waits until another startup cause takes place.

The output destination assigning process of the performance information is performed as an important feature of the present invention at step S90. When the user clicks a virtual switch for changing an output sound source on the display 8 with a mouse implement or the like, the selection of the output sound source is detected as a startup cause at step S65. Thus, the output destination assigning process is started up. Next, the output destination assigning process will be described in detail. FIG. 8(*a*) is a flow chart showing the output destination assigning process according to a first mode. In this mode, one output destination sound source is assigned to all performance information that is output from the sequencer program 21. When the process is started up, at step S900, output sound source designation data input by the user is stored in a TGS register. In this mode, whenever the user clicks the output source sound selecting switch, one of four options can be selected as shown in FIG. 8(*b*). The four options include: (a) no output to sound source, (b) output to software sound source, (c) output to hardware sound source, and (d) output to both of software sound source and hardware sound source. The selecting switch is cyclicly operated to select the desired one of the four options so that the value of modulo 4 of the number of times of the clicking operation is stored as the output sound source designation data to the TGS register. Next, the flow advances to step S901. At step S901, it is determined whether or not the sound source designated according to the contents of the TGS register is the software sound source 23 or the hardware sound source 12. Thereafter, the flow advances to step S902. At step S902, a logo or label that represents the type of the selected output sound source is displayed on the screen. FIG. 8(*c*) shows an example of logos on the display screen. With the logo, the user can recognize the type of the sound source being used.

FIG. 8(*d*) is a flow chart showing the output designation assigning process according to a second mode. In this mode, different sound sources can be selected a part by part of a music piece treated by the application program. When the process is started up, at step S910, input part designation data is obtained as variable p. Thereafter, the flow advances to step S911. At step S911, output sound source designation data corresponding to the designated part p is stored in a TGSP register. Next, the flow advances to step S912. At step S912, each part and a setup status of the output sound source corresponding thereto are displayed. By such a manner, part registers for storing the output sound source designation data are provided for individual parts, hence different sound sources can be selected for individual parts of the music piece.

For example, a drum part, a bass part, a guitar part, and an electric piano part can be assigned, respectively, to a software sound source (GM), a software sound source (XG), a hardware sound source (XG), and a hardware sound source (FM sound source). In this mode, the correspondence between each part and each sound source is manually set by the user. Alternatively, when the hardware sound source supports timbre data of a selected part, the hardware sound source can be used therefore. If not, the software sound source can be used therefor.

Referring back to FIG. 7, when the check result at step S65 indicates the first trigger (1) (namely, the start/stop request takes place), the flow advances to step S70. At step S70, the start/stop process is performed. Thereafter, the flow advances to step S71. At step S71, the start/stop status is displayed. Next, the flow returns to step S63. At step S63, the system waits until another startup cause takes place.

Figure 9B:
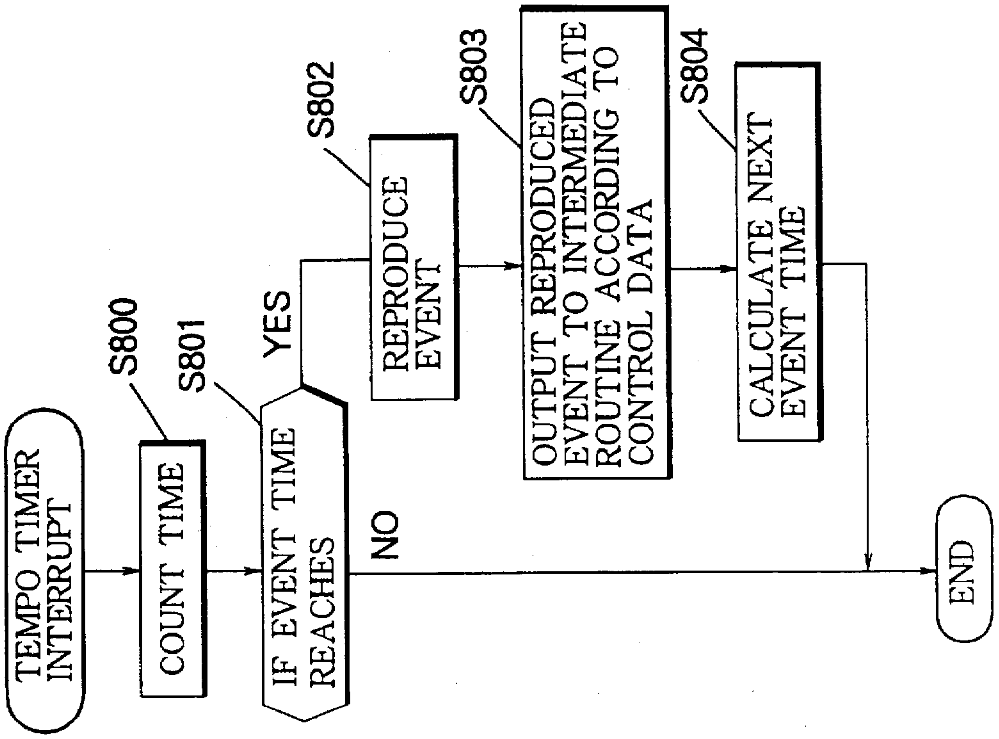
FIGS. 9(*a*) and 9(*b*) are flow charts showing a start/stop process and an event reproducing process.
Figure 9A:
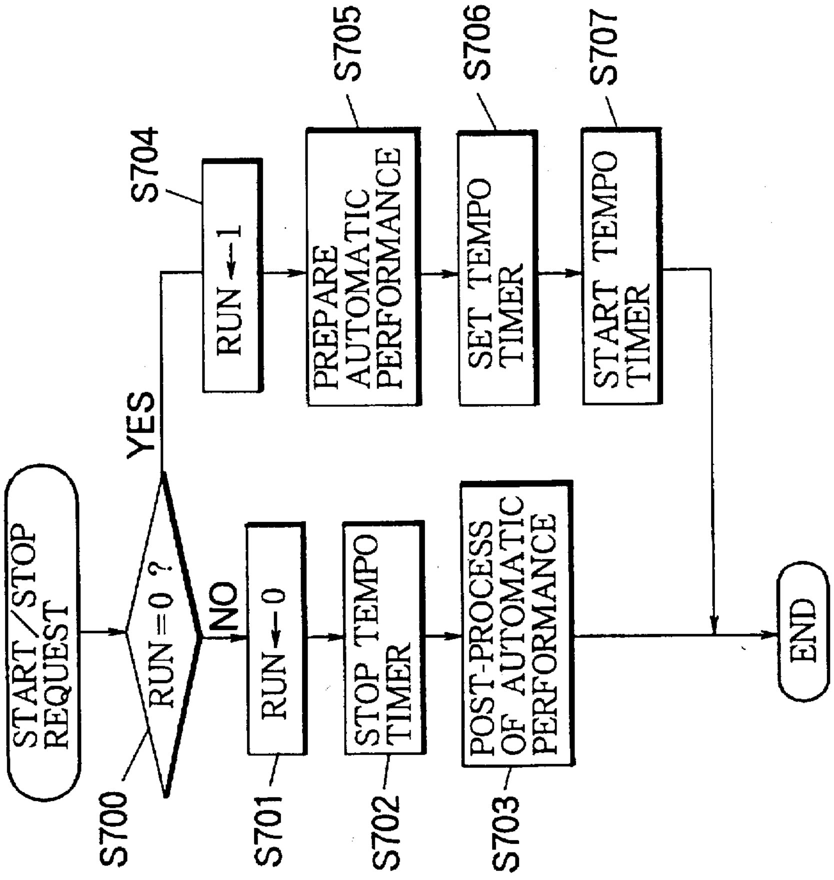

Next, with reference to FIG. 9(*a*), the start/stop process at step S70 will be described in detail. The start/stop request is issued by the user. For example, when the user clicks a predetermined field of the screen, the start/stop request is input. When the start/stop request is input, the flow advances to step S700. At step S700, it is determined whether or not the current status is the stop status with reference to a RUN flag. When the musical application program is being performed, the RUN flag is set in "1". When the check result is NO, since the musical application program is being performed, the flow advances to step S701. At step S701, the RUN flag is reset to "0". Thereafter, the flow advances to step S702. At step S702, the tempo timer is stopped. Next, the flow advances to step S703. At step S703, a post-process of the automatic instrumental accompaniments according to the music application program is performed and then the instrumental accompaniments are stopped.

On the other hand, when the musical application program is currently not executed and therefore the check result at step S700 is YES, the flow advances to step S704. At step S704, the RUN flag is set to "1". Next, the flow advances to step S705. At step S705, the automatic instrumental accompaniments are prepared. In this case, various processes are performed such that data necessary for the musical application program is transferred from the hard disk drive 9 or the like to the RAM 3. Then, a start address of the RAM 3 is set to a read pointer. A first event is prepared. Volumes of individual parts are set. Thereafter, the flow advances to step S706. At step S706, the tempo timer is set up. Next, the flow advances to step S707. At step S707, the tempo timer is started and the instrumental accompaniments are commenced.

Referring back to FIG. 7, when the check result at step S65 indicates the second trigger (2) (namely, a tempo timer interrupt takes place), the flow advances to step S80. At step S80, the event reproducing process is performed. Next, the flow advances to step S81. At step S81, the event is displayed. Thereafter, the flow returns to step S63. At step S63, the system waits until another startup cause takes place.

Next, with reference to FIG. 9(*b*), the event reproducing process at step S80 will be described in detail. The tempo timer interrupt is periodically generated so as to determine the tempo of an instrumental accompaniment performance. This interrupt determines the time or meter of the instrumental accompaniment. When the tempo timer interrupt takes place, the flow advances to step S800. At step S800, the time is counted. Thereafter, the flow advances to step S801. At step S801, it is determined whether or not the counted result exceeds an event time at which the event is to be reproduced. When the check result at step S801 is NO, the event reproducing process S80 is finished.

When the check result at step S801 is YES, the flow advances to step S802. At step S802, the event is reproduced. Namely, the event data is read from the RAM 3. Thereafter, the flow advances to step S803. At step S803, an output process is performed for the reproduced event. The output process for the reproduced event is an intermediation routine performed according to the contents of the TGS register that is set up in the output destination assigning process. In other words, when the event is output to the software sound source 23, the software sound source MIDI output API 22 is used. When the event is output to the hardware sound source 12, the MIDI output API 27 is used. Thus, the MIDI event is distributed to the assigned sound source. Thereafter, the flow advances to step S804. At step S804, duration data and event time are summed together so as to calculate the reproduction time of a next event. Thereafter, the event reproducing process routine is completed. The process at step S803 accords with the process in which the desired output sound source is assigned to all of the performance information indiscriminately as shown in FIG. 8(*a*). When an event is output by the reproduced event output process at S803, the MIDI receive interrupt takes place and the MIDI event is stored in the input buffer. After the interrupting process is completed, the flow returns to the above-described event reproducing process routine. Thereafter, the flow advances to step S804. At step S804, the next event time calculating process is executed.

Figure 10:
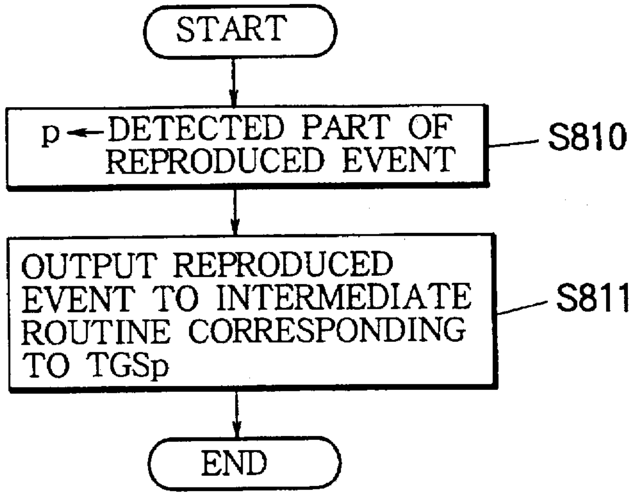
FIGS. 10(*a*) and 10(*b*) are flow charts showing a reproduced event output process.
Figure 10:
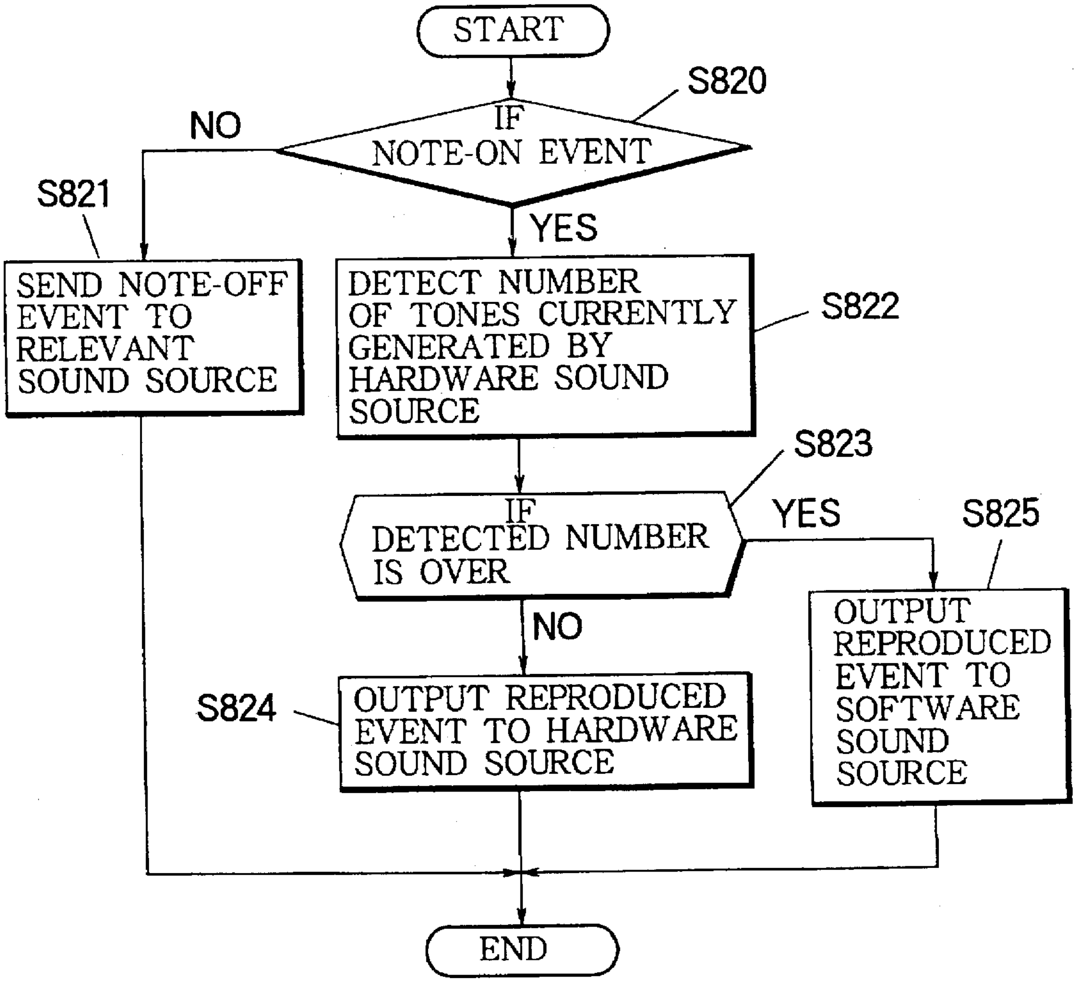

FIGS. 10(*a*) and 10(*b*) show modifications of the reproduced event output process at step S803. FIG. 10(*a*) shows a modification where different output destination sound sources are assigned for individual instrumental accompaniment parts. At step S810, a part corresponding to a reproduced event is detected and is memorized as the variable p. Next, the flow advances to step S811. At step S811, the contents of the register TGSp are referenced. The reproduced event is output to the intermediate routine (API) according to the referenced contents. Thus, the performance information is distributed to the respective sound sources assigned for individual parts.

FIG. 10(*b*) shows another modification where the performance information is distributed to the hardware sound source preceding to the software sound source, and an excessive portion of the performance information which exceeds the available channels of the hardware sound source is distributed to the software sound source. In this modification, at step S820, it is determined whether or not the reproduced event obtained at step S802 (FIG. 9(*b*)) is a note-on event. When the reproduced event is not a note-on event, the flow advances to step S821. At step S821, a note-off event is output to a sound source that has received a note-on event corresponding to the note-off event. Thereafter, the process is completed.

On the other hand, when the reproduced event is a note-on event and therefore the check result at step S820 is YES, the flow advances to step S822. At step S822, the number of currently active channels of the hardware sound source is detected. Thereafter, the flow advances to step S823. At step S823, it is determined whether or not the number of required channels for the note-on event exceeds the number of available channels of the hardware sound source. When the check result at step S823 is NO, the flow advances to step S824. At step S824, the reproduced event is output solely to the hardware sound source. When the check result at step S823 is YES, the flow advances to step S825. The reproduced event is also output to the software sound source 23. Thus, the excessive tones exceeding the limited tone generation channels of the hardware sound source can be supplementarily generated by the software sound source.

Referring back to FIG. 7, when the check result at step S65 indicates the fourth trigger (4) (namely, end request), the flow advances to step S100. At step S100, the end process is performed. Thereafter, the flow advances to step S101. At step S101, the display screen is cleared. After that, the process of the sequencer program is completed.

When the performance information is distributed to the internal hardware sound source composed of the sound card 12 or the external hardware sound source 6, these hardware sound sources execute a tone generating process in a known method.

When the performance information is distributed to both of the software sound source and the hardware sound source, the tone generated by the software sound source is delayed for a predetermined time period due to computation time lag. Thus, when the delay time is relatively long, the performance information supplied to the hardware sound source should be delayed to compensate for the predetermined time period.

When the sequencer program 21 is a kind of a multimedia program for synchronously reproducing a musical tone and other elements such as pictures, a process delay should be compensated. For example, when a karaoke software program is executed, a song word text is displayed while instrumental accompaniments are being performed. In addition, a graphic process is performed for gradually changing colors as the instrumental accompaniments advance (this process is referred to as "wipe process") or changing the song word text to be displayed. The text display process should be performed in synchronization with the instrumental accompaniments. Thus, when the hardware sound source or the software sound source is selected by the karaoke program, the display timing of the text should be changed corresponding to the selected sound source. In other words, when the software sound source is selected, the display process should be performed at a slower rate than the case where the hardware sound source is selected. Alternatively, instead of delaying the display of the text, the performance information supplied to individual sound sources may be adjusted. In other words, when the software sound source is selected, the performance information is output more quickly than the case where the hardware sound source is selected.

The selection of the hardware sound source and the software sound source can be performed in various manners. For example, it may be automatically detected whether the sound card 12 or the external sound source 6 is mounted or installed in a general-purpose computer. When the sound card 12 or the external sound source 6 is mounted, one of the hardware sound source and the external sound source is automatically selected. If not, the software sound source is automatically selected. Thus, even if the hardware sound source is removed or dismounted, it is not necessary to change settings of the computer. The present invention can be applied for the case where the performance information received from an external sequencer through the MIDI interface is supplied to an internal sound source in the same manner as above.

Figure 11:
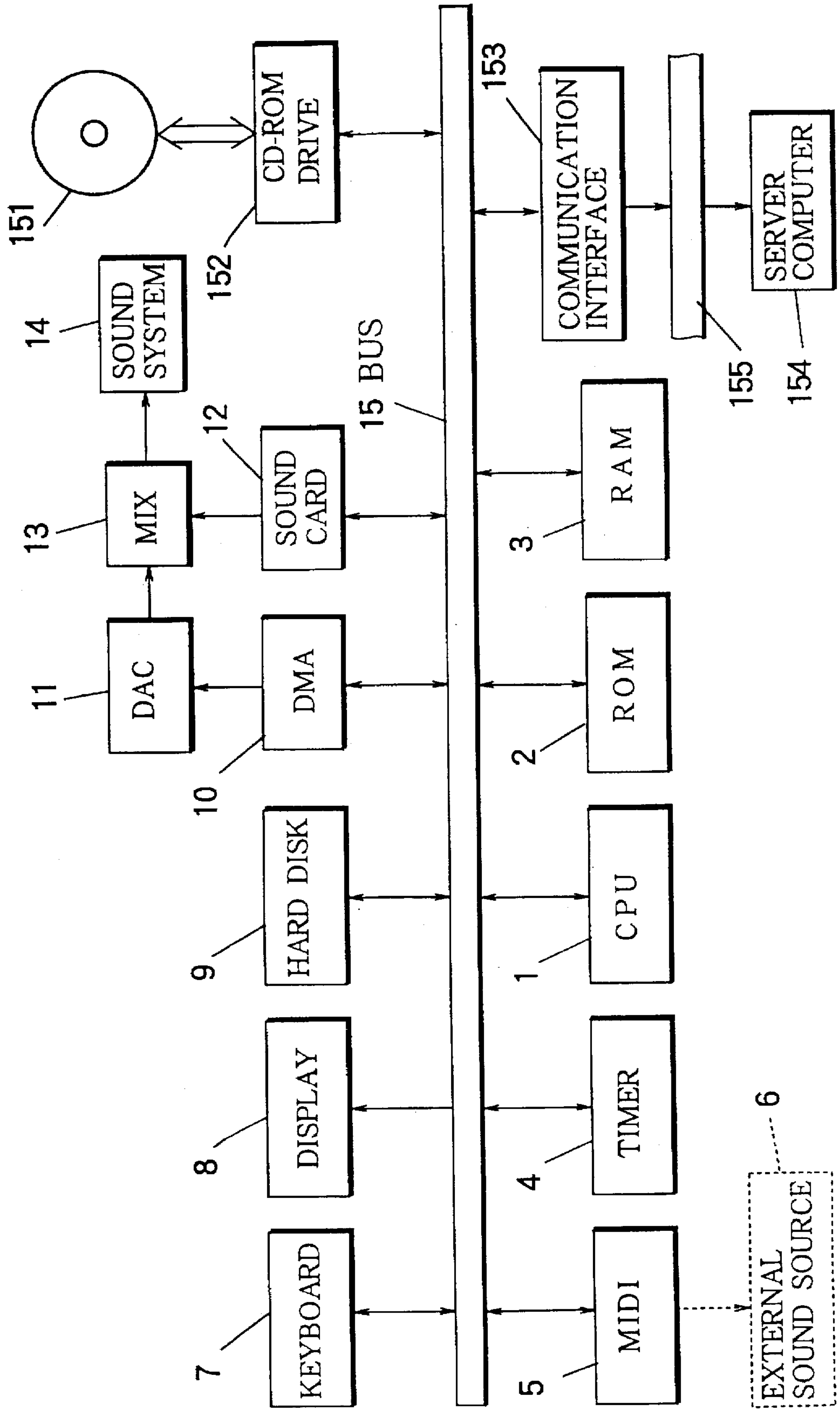
FIG. 11 is a schematic diagram showing another embodiment of the inventive musical sound generating apparatus.

FIG. 11 shows an additional embodiment of the inventive musical sound generating apparatus. This embodiment has basically the same construction as the first embodiment shown in FIG. 1. The same components are denoted by the same references as those of the first embodiment to facilitate better understanding of the additional embodiment. The storage such as ROM 2, RAM 3 and the hard disk 9 can store various data such as waveform data and various programs including the system control program or basic program, the waveform reading or generating program and other application programs. Normally, the ROM 2 provisionally stores these programs. However, if not, any program may be loaded into the apparatus. The loaded program is transferred to the RAM 3 to enable the CPU 1 to operate the inventive system of the musical sound generating apparatus. By such a manner, new or version-up programs can be readily installed in the system. For this purpose, a machine-readable media such as a CD-ROM (Compact Disc Read Only Memory) 151 is utilized to install the program. The CD-ROM 151 is set into a CD-ROM drive 152 to read out and download the program from the CD-ROM 151 into the HARD DISK 9 through the bus 15. The machine-readable media may be composed of a magnetic disk or an optical disk other than the CD-ROM 151.

A communication interface 153 is connected to an external server computer 154 through a communication network 155 such as LAN (Local Area Network), public telephone network and INTERNET. If the internal storage does not reserve needed data or program, the communication interface 153 is activated to receive the data or program from the server computer 154. The CPU 1 transmits a request to the server computer 154 through the interface 153 and the network 155. In response to the request, the server computer 154 transmits the requested data or program to the apparatus. The transmitted data or program is stored in the storage to thereby complete the downloading.

The inventive musical sound generating apparatus can be implemented by a personal computer which is installed with the needed data and programs. In such a case, the data and programs are provided to the user by means of the machine-readable media such as the CD-ROM 151 or a floppy disk. The machine-readable media contains instructions for causing the personal computer to perform the inventive musical sound generating method as described in conjunction with the previous embodiments. Namely, the inventive method of generating a musical tone using a computer machine having an application program 21, a software sound source 23 and a hardware sound source 12 is carried out by the steps of executing the application program 21 to produce an audio message, selecting at least one of the software sound source 23 and the hardware sound source 12 to distribute the audio message to the selected one of the software sound source 23 and the hardware sound source 12 through APIs 22 and 27 under control by the CPU 1 of the computer machine, selectively operating the software sound source 23 composed of a tone generation program, when the software sound source 23 is selected, by executing the tone generation program so as to generate the musical tone corresponding to the distributed audio message, and selectively operating the hardware sound source 12 having a tone generation circuit physically coupled to the computer machine, when the hardware sound source 12 is selected, so as to generate the musical tone corresponding to the distributed audio message.

In a specific form, the step of selecting comprises selecting both of the software sound source 23 and the hardware sound source 12 to concurrently distribute the audio message to both of the software sound source and the hardware sound source. The step of executing comprises executing the application program to produce the audio message which commands concurrent generation of a required number of musical tones while the hardware sound source has a limited number of tone generation channels capable of concurrently generating the limited number of musical tones, and the step of selecting comprises normally selecting the hardware sound source when the required number does not exceed the limited number to distribute the audio message only to the hardware sound source and supplementarily selecting the software sound source when the required number exceeds the limited number to distribute the audio message also to the software sound source to thereby ensure the concurrent generation of the required number of musical tones by both of the hardware sound source and the software sound source. The step of executing comprises executing the application program to produce audio messages which command generation of musical tones a part by part of a music piece created by the application program, and the step of selecting comprises selectively distributing the audio messages a part by part basis to either of the software sound source and the hardware sound source. The step of executing comprises executing the application program to produce the audio message which commands generation of a musical tone having a specific timbre, and the step of selecting comprises selecting the software sound source when the specific timbre is not available in the hardware sound source for distributing the audio message to the software sound source which supports the specific timbre. The step of executing comprises executing the application program to produce the audio message which specifies an algorithm used for generation of a musical tone, and the step of selecting comprises selecting the software sound source when the specified algorithm is not available in the hardware sound source for distributing the audio message to the software sound source which supports the specified algorithm. The step of executing comprises executing the application program to produce a multimedia message containing the audio message and a video message which commands reproduction of a picture, and each step of selectively operating comprises operating each of the software sound source and the hardware sound source to generate the musical tone in synchronization with the reproduction of the picture.

According to the present invention, since the audio message or performance information is distributed to either of the software sound source or the hardware sound source, freedom of selection of the sound sources by the user increases and the functional limit of the hardware sound source can be supplemented by the software sound source. In addition, a proper sound source can be used in conformity with the work load of the CPU. Moreover, in the musical sound generating method for outputting the performance information to both of the hardware sound source and the software sound source, ensemble instrumental accompaniments can be performed using both of the software and hardware sound sources. In this case, any time lag between the outputs from both of the software and hardware sound sources can be adjusted. Furthermore, in the musical sound generating method in which the performance information is distributed to the hardware sound source preceding to the software sound source, excessive tones exceeding the available channels of the hardware sound source are generated by the software sound source. More tones can be generated than the case where only the hardware sound source or only the software sound source is used. When a musical tone generated by the sound source and other information such as picture information are to be reproduced at the same time, even if either of the software sound source and the hardware sound source is selected as an output destination of the performance information, the musical tone generated from the designated sound source and the other information such as the picture information can be synchronously output.

What is claimed is:

1. A music apparatus virtually configured in a computer, comprising:

an application module comprising an application program executed by the computer to produce an audio message;

a software sound source comprising a tone generation program executed by the computer so as to generate a musical tone according to the audio message;

a hardware sound source having a tone generation circuit physically coupled to the computer for generating a musical tone according to the audio message;

an application program interface interposed to connect the application module to either of the software sound source and the hardware sound source; and control means for controlling the application program interface to selectively distribute the audio message from the application module to at least one of the software sound source and the hardware sound source through the application program interface.

2. A music apparatus according to claim 1, wherein the control means controls the application program interface to concurrently distribute the audio message to both of the software sound source and the hardware sound source.

3. A music apparatus according to claim 1, wherein the application module produces the audio message which commands concurrent generation of a required number of musical tones while the hardware sound source has a limited number of tone generation channels capable of concurrently generating the limited number of musical tones, and wherein the control means normally operates when the required number does not exceed the limited number for distributing the audio message only to the hardware sound source and supplementarily operates when the required number exceeds the limited number for distributing the audio message also to the software sound source to thereby ensure the concurrent generation of the required number of musical tones by both of the hardware sound source and the software sound source.

4. A music apparatus according to claim 1, wherein the application module produces audio messages which command generation of musical tones in a part by part manner of a music piece created by the application program, and wherein the control means selectively distributes the audio messages on a part by part basis to either of the software sound source and the hardware sound source.

5. A music apparatus according to claim 1, wherein the application module produces the audio message which commands generation of a musical tone having a specific timbre, and wherein the control means operates when the specific timbre is not available in the hardware sound source for distributing the audio message to the software sound source which supports the specific timbre.

6. A music apparatus according to claim 1, wherein the application module produces the audio message which specifies an algorithm used for generation of a musical tone, and wherein the control means operates when the specified algorithm is not available in the hardware sound source for distributing the audio message to the software sound source which supports the specified algorithm.

7. A music apparatus according to claim 1, wherein the application module produces a multimedia message containing the audio message and a video message which commands reproduction of a picture, and wherein the control means controls a selected one of the software sound source and the hardware sound source to generate the musical tone in synchronization with the reproduction of the picture.

8. A method for generating a musical tone using a computer having an application program, a software sound source and a hardware sound source, the method comprising the steps of:

executing the application program to produce an audio message;

selecting at least one of the software sound source and the hardware sound source to distribute the audio message to the selected one of the software sound source and the hardware sound source;

selectively operating the software sound source composed of a tone generation program, when the software sound source is selected, by executing the tone generation program so as to generate the musical tone corresponding to the distributed message; and selectively operating the hardware sound source having a tone generation circuit physically coupled to the computer, when the hardware sound source is selected, so as to generate the musical tone corresponding to the distributed audio message.

9. The method according to claim 8, wherein the step of selecting comprises selecting both of the software sound source and the hardware sound source to concurrently distribute the audio message to both of the software sound source and the hardware sound source.

10. The method according to claim 8, wherein the step of executing comprises executing the application program to produce the audio message which commands concurrent generation of a required number of musical tones while the hardware sound source has a limited number of tone generation channels capable of concurrently generating the limited number of musical tones, and wherein the step of selecting comprises normally selecting the hardware sound source when the required number does not exceed the limited number to distribute the audio message only to the hardware sound source and supplementarily selecting the software sound source when the required number exceeds the limited number to distribute the audio message also to the software sound source to thereby ensure the concurrent generation of the required number of musical tones by both of the hardware sound source and the software sound source.

11. The method according to claim 8, wherein the step of executing comprises executing the application program to produce audio messages which command generation of musical tones in a part by part manner of a music piece created by the application program, and wherein the step of selecting comprises selectively distributing the audio messages on a part by part basis to either of the software sound source and the hardware sound source.

12. The method according to claim 8, wherein the step of executing comprises executing the application program to produce the audio message which commands generation of a musical tone having a specific timbre, and wherein the step of selecting comprises selecting the software sound source when the specific timbre is not available in the hardware sound source for distributing the audio message to the software sound source which supports the specific timbre.

13. The method according to claim 8, wherein the step of executing comprises executing the application program to produce the audio message which specifies an algorithm used for generation of a musical tone, and wherein the step of selecting comprises selecting the software sound source when the specified algorithm is not available in the hardware sound source for distributing the audio message to the software sound source which supports the specified algorithm.

14. The method according to claim 8, wherein the step of executing comprises executing the application program to produce a multimedia message containing the audio message and a video message which commands reproduction of a picture, and wherein each step of selectively operating comprises operating each of the software sound source and the hardware sound source to generate the musical tone in synchronization with the reproduction of the picture.

15. A machine readable media containing instructions for causing a computer having an application program, an software sound source and a hardware sound source to perform a method of generating a musical tone, the method comprising the steps of:

executing the application program to produce an audio message;

selecting at least one of the software sound source and the hardware sound source to distribute the audio message to the selected one of the software sound source and the hardware sound source;

selectively operating the software sound source composed of a tone generation program, when the software sound source is selected, by executing the tone generation program so as to generate the musical tone corresponding to the distributed audio message; and selectively operating the hardware sound source having a tone generation circuit physically coupled to the computer, when the hardware sound source is selected, so as to generate the musical tone corresponding to the distributed audio message.

16. The machine-readable media according to claim 15, wherein the step of selecting comprises selecting both of the software sound source and the hardware sound source to concurrently distribute the audio message to both of the software sound source and the hardware sound source.

17. The machine-readable media according to claim 15, wherein the step of executing comprises executing the application program to produce the audio message which commands concurrent generation of a required number of musical tones while the hardware sound source has a limited number of tone generation channels capable of concurrently generating the limited number of musical tones, and wherein the step of selecting comprises normally selecting the hardware sound source when the required number does not exceed the limited number to distribute the audio message only to the hardware sound source and supplementarily selecting the software sound source when the required number exceeds the limited number to distribute the audio message also to the software sound source to thereby ensure the concurrent generation of the required number of musical tones by both of the hardware sound source and the software sound source.

18. The machine-readable media according to claim 15, wherein the step of executing comprises executing the application program to produce audio message which command generation of musical tones in a part by part manner of a music piece created by the application program, and wherein the step of selecting comprises selectively distributing the audio messages on a part by part basis to either of the software sound source and the hardware sound source.

19. The machine-readable media according to claim 15, wherein the step of executing comprises executing the application program to produce the audio message which commands generation of a musical tone having a specific timbre, and wherein the step of selecting comprises selecting the software sound source when the specific timbre is not available in the hardware sound source for distributing the audio message to the software sound source which supports the specific timbre.

20. The machine-readable media according to claim 15, wherein the step of executing comprises executing the application program to produce the audio message which specifies an algorithm used for generation of a musical tone, and wherein the step of selecting comprises selecting the software sound source when the specified algorithm is not available in the hardware sound source to distribute the audio message to the software sound source which supports the specified algorithm.

21. The machine-readable media according to claim 15, wherein the step of executing comprises executing the application program to produce a multimedia message containing the audio message and a video message which commands reproduction of a picture, and wherein each step of selectively operating comprises operating each of the software sound source and the hardware sound source to generate the musical tone in synchronization with the reproduction of the picture.

* * * * *